United States Patent [19]

Fischer et al.

[11] 4,443,265

[45] Apr. 17, 1984

[54] CERAMIC COLOR BODY

[75] Inventors: Robert Fischer, Obertshausen; Heinz D. de Ahna, Egelsbach, both of Fed. Rep. of Germany

[73] Assignee: Degussa Aktiengesellschaft, Fed. Rep. of Germany

[21] Appl. No.: 418,844

[22] Filed: Sep. 16, 1982

[30] Foreign Application Priority Data

Oct. 15, 1981 [DE] Fed. Rep. of Germany ....... 3140914

[51] Int. Cl.$^3$ ............................................... C09C 1/00
[52] U.S. Cl. .................................................. 106/306
[58] Field of Search ....................................... 106/306

[56] References Cited

U.S. PATENT DOCUMENTS 1,220,973  3/1917  Gardner ............................ 106/306

FOREIGN PATENT DOCUMENTS

| | | | |
|---|---|---|---|
| 1086834 | 8/1960 | Fed. Rep. of Germany | 106/306 |
| 1475635 | 2/1967 | France | 106/306 |
| 47-32814 | 8/1972 | Japan | 106/306 |
| 384473 | 12/1932 | United Kingdom | 106/306 |
| 838817 | 5/1981 | U.S.S.R. | 106/306 |

*Primary Examiner*—Helen M. McCarthy
*Attorney, Agent, or Firm*—Cushman, Darby & Cushman

[57] ABSTRACT

There are described new ceramic pigments consisting essentially of a colorless matrix and color furnishing materials in the production of which there is not required a fluoride mineralizer. The matrix thererby consists essentially of mixed alkaline earth phosphates, especially calcium-magnesium phosphates and barium-magnesium phosphates.

6 Claims, No Drawings

CERAMIC COLOR BODY

BACKGROUND OF THE INVENTION

The invention is directed to ceramic pigments consisting essentially of a colorless matrix and color furnishing compounds which are bound in the matrix material as discrete particles or in the matrix lattice as color furnishing ions.

Ceramic pigments in which the color furnishing materials either are embedded as discrete particles in the matrix (occluded pigments) or are bound in the lattice of the matrix in ionic form (host lattice pigments) are known extensively. Normally, they are produced by heating the starting materials for the matrix and the color furnishing compounds in the presence of mineralizers. Generally, there are used fluorides, especially alkali fluorides, as mineralizers.

Thus, for example, according to Seabright U.S. Pat. No. 2,441,447, blue and green ceramic pigments are produced by heating zirconium oxide, silica, and vanadium pentoxide in the presence of a fluoride mineralizer at a temperature of 550° to 1200° C. The presence of a fluoride mineralizer indeed is not absolutely necessary, but then for production of the matrix, calcining must be carried out at substantially higher temperatures. However, working with fluoride mineralizers is undesired for environmental reasons.

Therefore, it was the problem of the present invention to find ceramic pigments consisting essentially of a colorless matrix and color furnishing compounds which are bound as discrete particles in the matrix material or as color furnishing ions in the matrix lattice, which correspond to the ceramic requirements such as glazing, light and temperature resistance and which do not require a fluoride mineralizer in their production.

The pigments can be prepared by calcining at an appropriate temperature, e.g., 550°–1200° C.

SUMMARY OF THE INVENTION

This problem was solved according to the invention by having the matrix consist of or consist essentially of alkaline earth metal phosphates. There have proven especially good as matrix materials calcium-magnesium-phosphate and barium-magnesium phosphate, but there can also be employed other alkaline earth metal phosphates having two or more alkaline earth metals such as magnesium, calcium, strontium, and barium.

When there are employed two alkaline earth metal phosphates, the mole ratio of the two alkaline earth metals is such that there are employed 10 to 90 mole % of one alkaline earth metal with the balance being the other alkaline earth metal. When more than two alkaline earth metals are employed, none of them is present in an amount more than 10 mole % based on 100 mole % of all the alkaline earth metals.

As color furnishing compounds, there are preferably employed oxides of transition metals (e.g., titanium, vanadium, chromium, manganese, iron, cobalt, nickel, or copper). Examples of such oxides are $Cr_2O_3$, $CoO$, $CuO$, $NiO$, $Fe_2O_3$, $MnO_2$, and $Pr_6O$. Thereby, these chromophores with the different alkaline earth metal phosphates in part yield differently colored ceramic pigments.

The compositions can consist of or consist essentially of the stated materials.

The following examples explain the ceramic pigments in greater detail.

DETAILED DESCRIPTION

Example 1

40 grams of $(NH_4)_2HPO_4$ were intimately mixed with 26.4 grams of $CaCO_3$, 11.2 grams of $MgCO_3$, 7.5 grams of alkali chloride, and 10 grams of $CuO$. This mixture was calcined in a crucible at 1000° C. The calcined product obtained was ground, washed, and dried. The turquoise colored pigment obtained is stable in most glaze systems.

Example 2

In place of 10 grams of $CuO$, there were employed 13 grams of Mn II carbonate in the formulation of Example 1. The mixture obtained was calcined in a crucible at 1150° C. After the grinding, washing, and drying of the calcined product, the thus obtained pigment can be used to produce rose colored glazes.

Example 3

39.5 grams of $BaCO_3$, 8.5 grams of $MgCO_3$, 8 grams of $Cr_2O_3$, and 40 grams of $(NH_4)_2HPO_4$ were intimately mixed in a mill and calcined at 1000° C. The calcined product was worked up as set forth above, and the pigment obtained used for coloring glazes to produce yellow-green colors.

The entire disclosure of German priority application P 3140914.8 is hereby incorporated by reference.

What is claimed is:

1. In a ceramic pigment consisting essentially of a colorless matrix and at least one color furnishing compound which is embedded as discrete particles in the matrix material or are bound in the matrix lattice as color furnishing ions the improvement that the matrix consists essentially of mixed alkaline earth metal phosphates, there being present at least 10 mole % of each alkaline earth metal based on 100 mole % of all the alkaline earth metals present in the phosphates wherein the matrix consists essentially of calcium-magnesium phosphates or barium-magnesium phosphates.

2. A ceramic pigment according to claim 1 wherein the color furnishing compound is an oxide of a transition element.

3. A ceramic pigment according to claim 1 wherein the color furnishing compound is an oxide of chromium, cobalt, copper, nickel, iron, manganese, or praseodymium.

4. A ceramic pigment according to claim 1 consisting of said colorless matrix and color furnishing compound.

5. A ceramic pigment according to claim 4 wherein the color furnishing compound is an oxide of a transition element.

6. A ceramic pigment according to claim 4 wherein the color furnishing compound is an oxide of chromium, cobalt, copper, nickel, iron, manganese, or praseodymium.

* * * * *